(12) United States Patent
Gulkanat et al.

(10) Patent No.: US 10,271,685 B2
(45) Date of Patent: Apr. 30, 2019

(54) CLAMSHELL GRIDDLE WITH GAP ADJUSTMENT

(71) Applicants: Bektas C. Gulkanat, Charlotte, NC (US); Kacy W. Denning, Charlotte, NC (US)

(72) Inventors: Bektas C. Gulkanat, Charlotte, NC (US); Kacy W. Denning, Charlotte, NC (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 187 days.

(21) Appl. No.: 15/040,525

(22) Filed: Feb. 10, 2016

(65) Prior Publication Data

US 2016/0227963 A1    Aug. 11, 2016

Related U.S. Application Data

(60) Provisional application No. 62/114,669, filed on Feb. 11, 2015.

(51) Int. Cl.
A47J 37/06    (2006.01)

(52) U.S. Cl.
CPC .... *A47J 37/0611* (2013.01); *A47J 2037/0617* (2013.01)

(58) Field of Classification Search
CPC ............ A47J 37/0611; A47J 2037/0617; A47J 27/62; A47J 36/12; A47J 37/0704; A47J 43/18; A47J 27/14; A47J 36/022; A47J 36/38; A47J 37/0676; A47J 2202/00; A47J 27/20; A47J 36/36; A47J 37/00; A47J 37/041; A21B 5/02; A21B 5/023; A21B 5/03; A21C 11/006; A23L 5/10; F23D 14/02; F23D 14/34; F23D 14/583; F23D 2900/14041; H05B 2203/032; H05B 3/68; H05B 3/72

USPC ......... 99/349, 379, 372, 353, 378, 374, 375, 99/331, 400, 446, 377, 425, 422, 340, 99/423, 445, 342, 385, 330, 389, 426, 99/332, 351, 355, 376, 401, 403, 444, 99/448, 333, 334, 335, 339, 343, 344, 99/350, 367, 380, 381, 391, 395, 402, 99/407, 419, 424, 449, 450

See application file for complete search history.

(56) References Cited

U.S. PATENT DOCUMENTS

| | | |
|---|---|---|
| 4,913,040 A | 4/1990 | Sherman et al. |
| 5,341,727 A | 8/1994 | Dickson |
| 5,473,976 A | 12/1995 | Hermansson |
| 5,531,155 A | 7/1996 | Pellicane et al. |

(Continued)

FOREIGN PATENT DOCUMENTS

| | | |
|---|---|---|
| CA | 130560 | 3/2010 |
| EP | 001034003-0001 | 11/2008 |
| EP | 001033997-0001 | 12/2008 |

*Primary Examiner* — Phuong T Nguyen
*Assistant Examiner* — Chris Q Liu
(74) *Attorney, Agent, or Firm* — Thompson Hine LLP (57) ABSTRACT

A griddle apparatus includes a lower griddle plate, and an upper griddle plate mounted on arm assembly for movement relative to the lower griddle plate between a lower cooking position and an upper access position. The arm assembly carries a gap adjustment mechanism that includes a plurality of gap defining orientations, and the gap adjustment mechanism moves with the arm assembly.

7 Claims, 14 Drawing Sheets

(56) References Cited

U.S. PATENT DOCUMENTS

| | | | | |
|---|---|---|---|---|
| 5,543,166 | A | * | 8/1996 | Masel ............ A47J 37/047 |
| | | | | 426/438 |
| 5,619,907 | A | | 4/1997 | Orgelmacher |
| 5,890,419 | A | | 4/1999 | Moravec |
| 6,213,672 | B1 | * | 4/2001 | Varga ............ A47L 13/20 |
| | | | | 15/144.4 |
| 6,439,108 | B1 | * | 8/2002 | Wu ............ A47J 37/0611 |
| | | | | 99/349 |
| 6,591,740 | B1 | * | 7/2003 | Hsu ............ A47J 37/0704 |
| | | | | 99/349 |
| 6,679,139 | B2 | * | 1/2004 | Brenizer ............ B25B 13/14 |
| | | | | 81/133 |
| D598,709 | S | | 8/2009 | Scholz et al. |
| D600,069 | S | | 9/2009 | Scholz et al. |
| D605,467 | S | | 12/2009 | Scholz et al. |
| 2009/0308260 | A1 | | 12/2009 | Trost |
| 2010/0107894 | A1 | | 5/2010 | Scholz et al. |
| 2010/0107895 | A1 | | 5/2010 | Scholz et al. |
| 2010/0107896 | A1 | | 5/2010 | Scholz et al. |
| 2010/0107897 | A1 | | 5/2010 | Scholz et al. |
| 2010/0186601 | A1 | * | 7/2010 | Gulkanat ............ A47J 37/0611 |
| | | | | 99/372 |
| 2015/0007530 | A1 | * | 1/2015 | Cho ............ F02M 35/0203 |
| | | | | 55/357 |

\* cited by examiner

CLAMSHELL GRIDDLE WITH GAP ADJUSTMENT

TECHNICAL FIELD

This application relates generally to clamshell griddle systems and, more specifically, to a gap adjustment system for an upper plate arrangement for a clamshell griddle system.

BACKGROUND

Two-sided cooking (e.g., cooking with heat applied from griddle plate members both above and below the food product) generally reduces the overall cooking time and the amount of operator attention required for cooking the food products. Not only is cooking time dramatically reduced with two-sided cooking, but certain foods such as hamburgers, are improved in taste and texture by the application of force (e.g., a compressing of sandwiching type force) during the cooking process. Therefore, two-sided griddle-type cooking devices, also known as clam shell griddles, are highly desirable in fast food restaurants.

It would be desirable to provide an upper griddle mechanism adaptable to existing product lines and facilitating ease of operator use.

SUMMARY

In one aspect, a griddle apparatus includes a lower griddle plate, and an upper griddle plate mounted on arm assembly for movement relative to the lower griddle plate between a lower cooking position and an upper access position. The arm assembly carries a gap adjustment mechanism that includes a plurality of gap defining orientations, and the gap adjustment mechanism moves with the arm assembly.

In one implementation, the gap adjustment mechanism includes a component that rotates about an axis during gap adjustment.

In one implementation, the component rotates about an axis that is generally horizontal when the arm assembly is in the lower cooking position.

In another implementation, the component rotates about an axis that is generally vertical when the arm assembly is in the lower cooking position.

In one implementation, the component is sized and shaped to permit one-handed operator rotation.

In another aspect, a griddle apparatus includes a support column, and an arm assembly including an upper griddle plate. The arm assembly is pivotally connected to the support column for movement between a lower cooking position and a raised access position. The arm assembly further includes a gap adjustment mechanism located toward a front side of the arm assembly but rearwardly of an operator handle used to pivot the arm assembly.

In one implementation, the gap adjustment mechanism is located along an axial length of the arm assembly between the upper griddle plate and the operator handle.

The details of one or more embodiments are set forth in the accompanying drawings and the description below. Other features, objects, and advantages will be apparent from the description and drawings, and from the claims.

DETAILED DESCRIPTION

Figure 1:
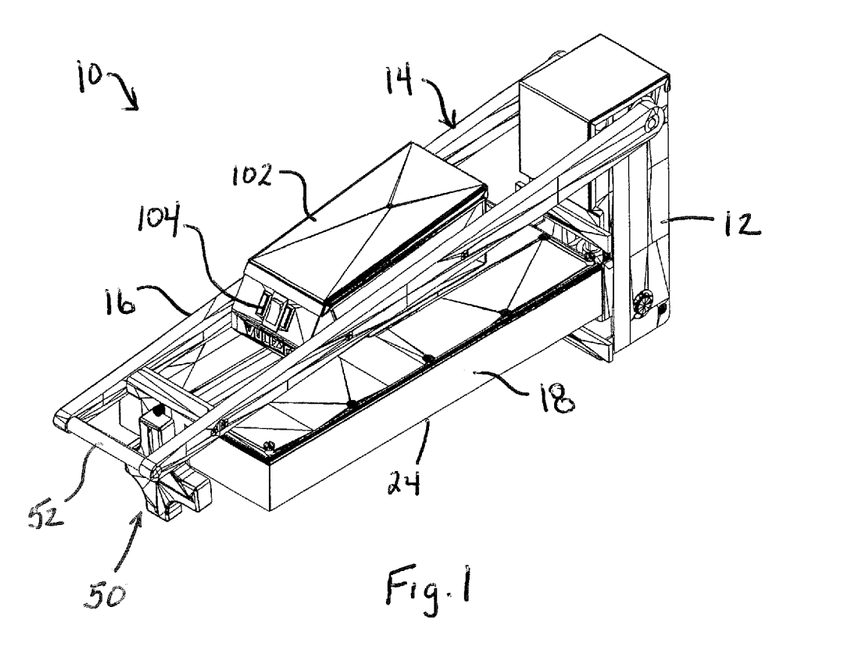
FIG. 1 is a perspective view of an upper griddle mechanism.

Referring to FIG. 1, a perspective view of one embodiment of an upper griddle mechanism 10 is shown. The upper griddle mechanism 10 includes an upright mount column 12 (aka a support column) and an arm assembly 14 pivotally connected to the mount column. The arm 14 includes an arm body or frame 16 and an upper griddle plate assembly 18 connected to an underside of the arm body 16. The connecting joint between the arm body 16 and the griddle plate assembly 18 may be a universal type joint that enables the griddle plate assembly to pivot and/or float relative to the arm body. The exact structure of the griddle plate assembly may vary, but the griddle plate assembly generally includes a lower, heated (e.g., heated by one or more resistive elements inside the assembly) cooking surface 24 that can rest atop food product for cooking the food product. A control box 102 is located on the arm assembly 14 and includes internal circuitry and/or other components (e.g., electrical controls and components such as thermostat, high-limit sensors, control switches 104, lights, etc.), to enable suitable control of the heating of the upper griddle plate.

Figure 2:
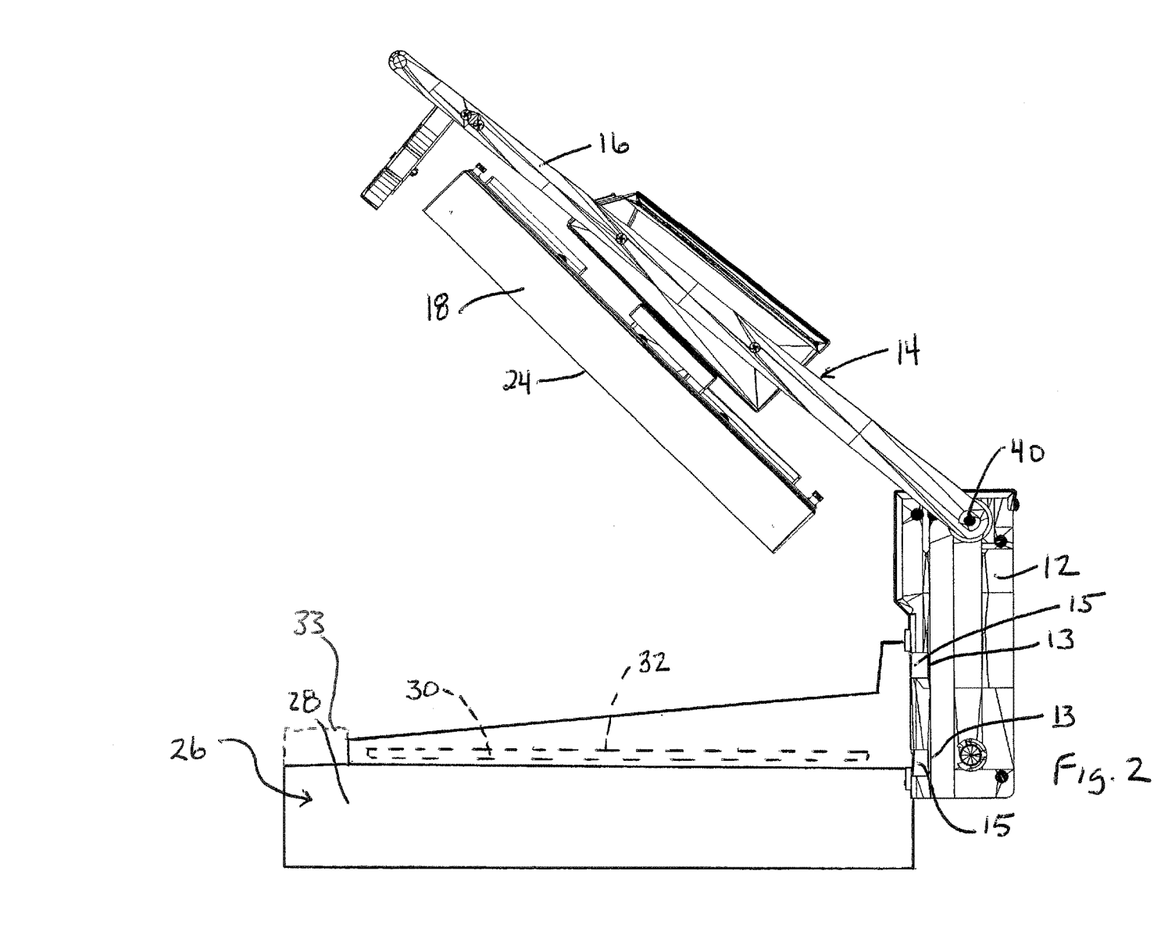
FIG. 2 is a side elevation of an exemplary griddle apparatus including the griddle mechanism of FIG. 1 with the griddle arm in an upper access position.
Figure 3:
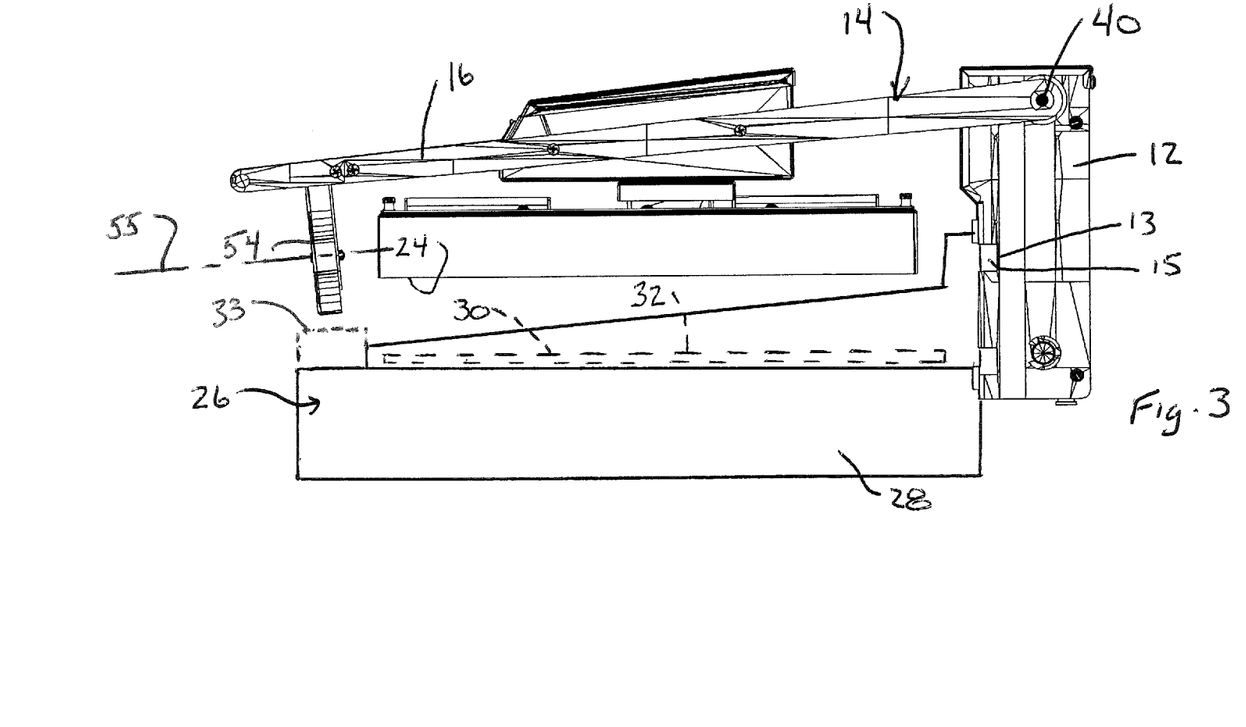
FIG. 3 is a side elevation of an exemplary griddle apparatus including the griddle mechanism of FIG. 1 with the griddle arm in a lower cooking position.

Referring to FIGS. 2 and 3, the upper griddle mechanism is shown mounted to an exemplary griddle apparatus 26 having a griddle body 28 and a griddle plate 30 with an upwardly facing cooking surface 32. The upper griddle mechanism is intended for use with a variety of cooking griddle apparatus, including counter top size griddle apparatus as shown, as well as standard size griddle apparatus (e.g., griddles having a body/frame sized for placement on the floor of a cooking environment). The mount column 12 is used to secure the upper griddle mechanism to the griddle apparatus at the rear side of the griddle body/frame, but could be secured to the griddle/apparatus body/frame at other locations, such as the left or right side.

In the illustrated embodiment, the body of the mount column 12 includes slots 13 that face toward the rear side of the griddle body and into which square mount brackets 15 are positioned. The square mount brackets may be secured to the griddle apparatus utilizing a pair of L-shaped brackets that are secured to each side of the griddle apparatus at the rear corners (e.g., using machine screws), with the mount brackets 15 extending laterally between the two L-shaped brackets. The interaction of the mount brackets and slots provided increased stability to the mount connection. Fasteners may be used to further secure the mount column to the rear panel of the griddle apparatus. Of course, other mount arrangement could be used in connection with the upper griddle mechanism.

As shown, the arm assembly 14 is pivotable about an axis 40 that is fixed relative to the mount column 12 for movement between a lowered cooking position (FIG. 3) and a raised non-cooking position (FIG. 2). The mount column 12 is mounted to the cooking apparatus 26 and extends above the upwardly facing surface griddle surface 32. When the arm 14 is in the cooking position the lower cooking surface 24 of the upper griddle plate 22 opposes the upwardly facing cooking surface 32 of the lower griddle plate so that food items can be heated and cooked from both above and below by the two heated surfaces. When the arm 14 is in the raised non-cooking position food items can removed from or placed on the lower griddle plate 30, or otherwise manipulated on the griddle plate 30.

Figure 4:
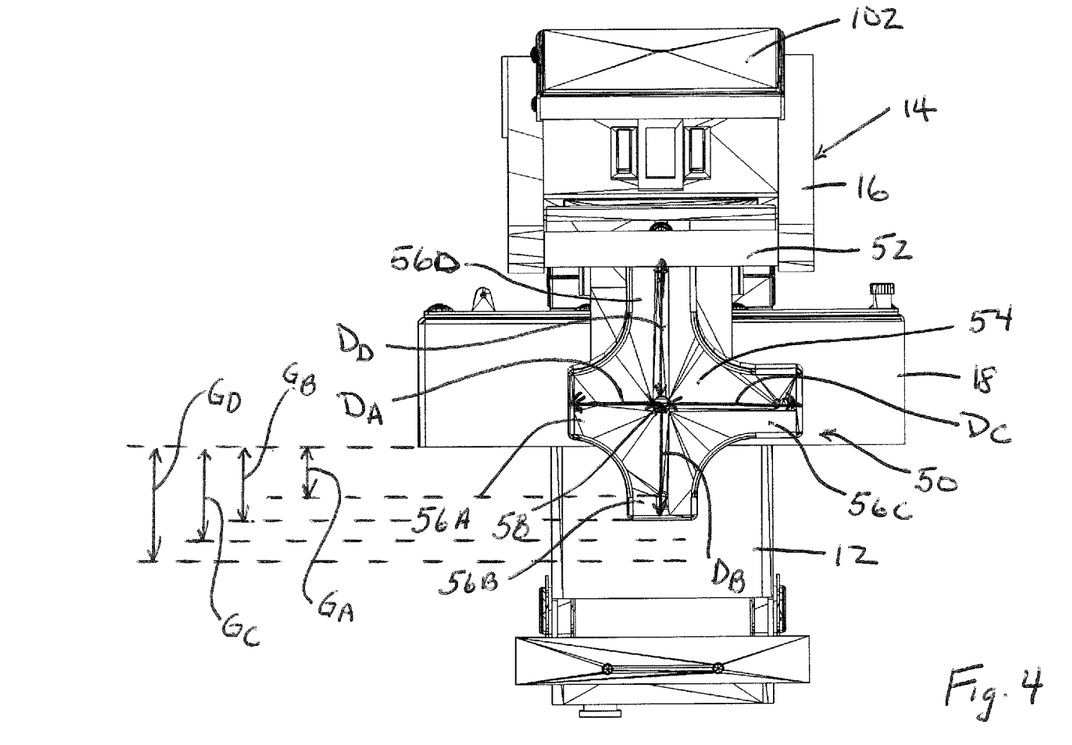
FIG. 4 is a front elevation view upper griddle mechanism including a gap adjustment mechanism.

The arm assembly includes a gap control and adjustment mechanism 50 at its front side, below the arm assembly handle 52. The mechanism 50 includes an adjustment block 54 that is mounted for rotation, where the block includes a set of supporting extensions 56A, 56B, 56C and 56D that extend various distances (represented as $D_A$, $D_B$, $D_C$ and $D_D$) from the rotation axis 58 of the block, where $D_D$ is larger than $D_C$, which is larger than $D_B$, which is larger than $D_A$. In this case, 4 extensions spaced at every 90 degrees are used, but variations are possible, including variations with more or less extensions as well as variations in which the periphery of the adjustment block is configured as a continuous cam surface enabling continuous gap size adjustment within a defined range. Depending upon the rotational position of the adjustment block 54, different size gaps $G_A$, $G_B$, $G_C$ and $G_D$ are defined between the lowest part of the adjustment block and the underside of the griddle plate. In the illustrated embodiment, per FIG. 3, the adjustment block 54 is positioned to engage with a portion of the griddle apparatus forward of the lower griddle plate 30 and lower than the upper surface of the lower griddle plate, and therefore gaps $G_A$, $G_B$, $G_C$ and $G_D$ are all somewhat larger than the actual gap size that will be defined between the upper cooking surface 24 and the lower cooking surface 32. However, in another variation the portion of the griddle forward of the lower griddle plate 30 may actually be higher than the cooking surface 32 (e.g., as represented by dashed line 33), in which case the gaps GA, GB, GC and GD would all be somewhat smaller than the actual gap size that will be defined between the upper cooking surface 24 and the lower cooking surface 32.

Figure 5:
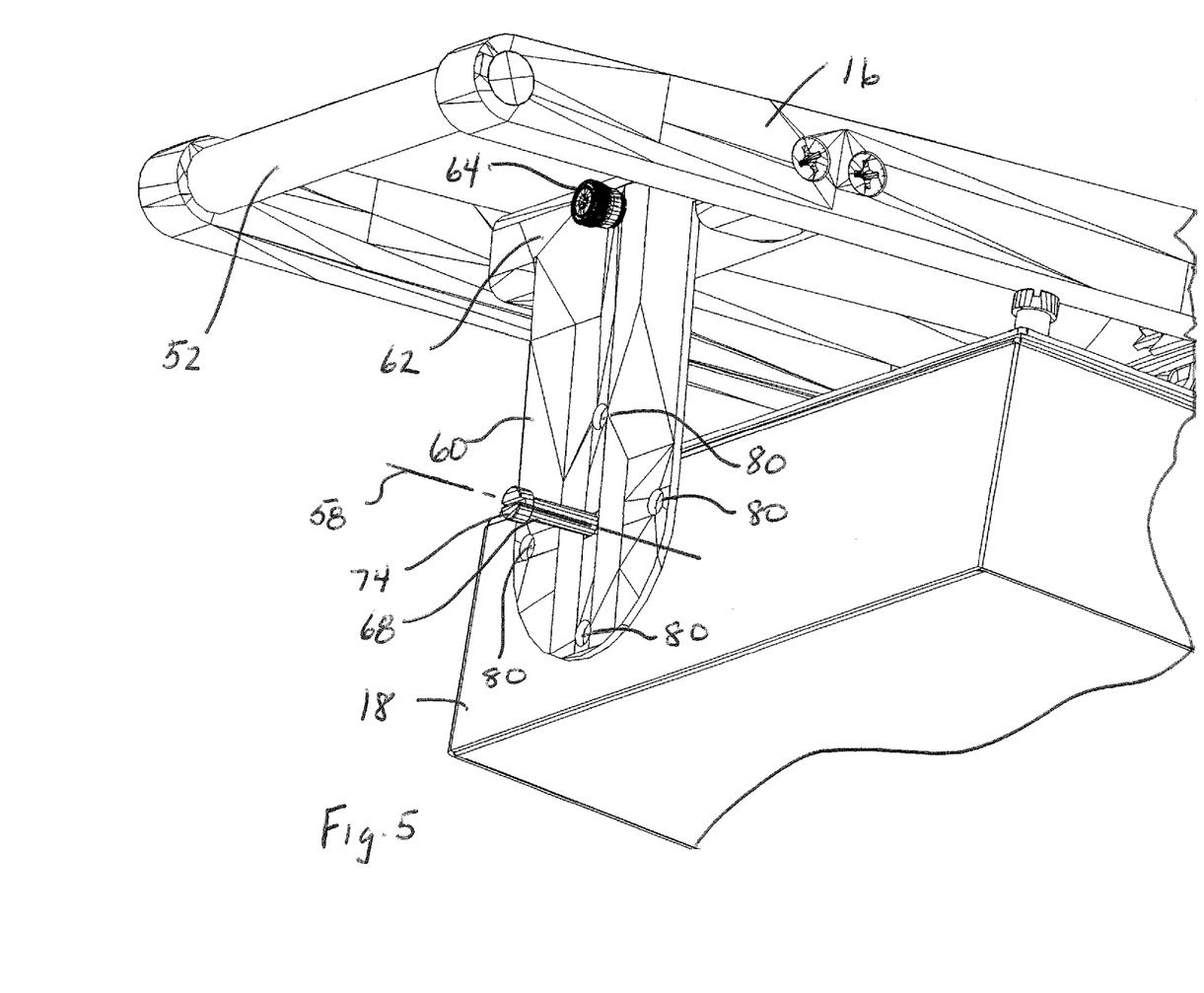
FIG. 5 is a partial front perspective of the upper griddle mechanism with adjustment block not shown.
Figure 6:
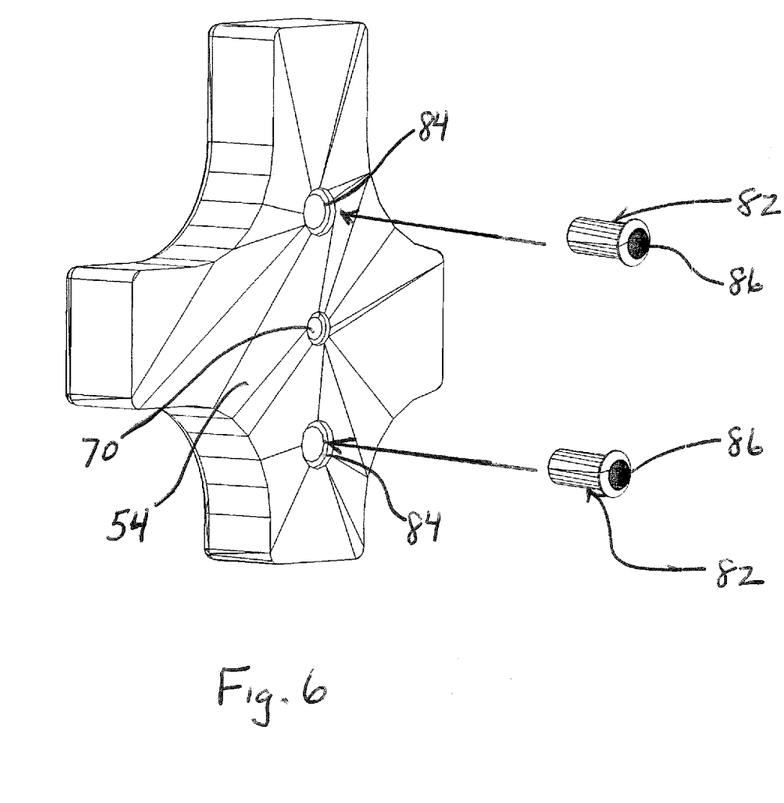
FIG. 6 is a perspective view of the rear side of the adjustment block and ball detent assemblies.
Figure 7:
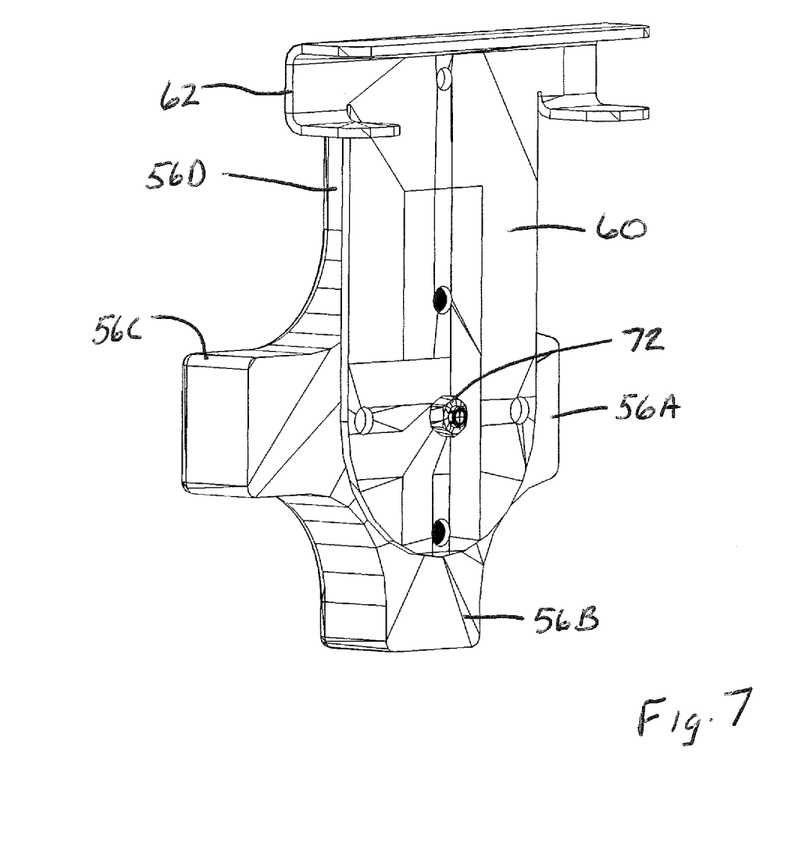
FIG. 7 is a perspective view of the rear side of the mounting plate to which the adjustment block is mounted.
Figure 8:
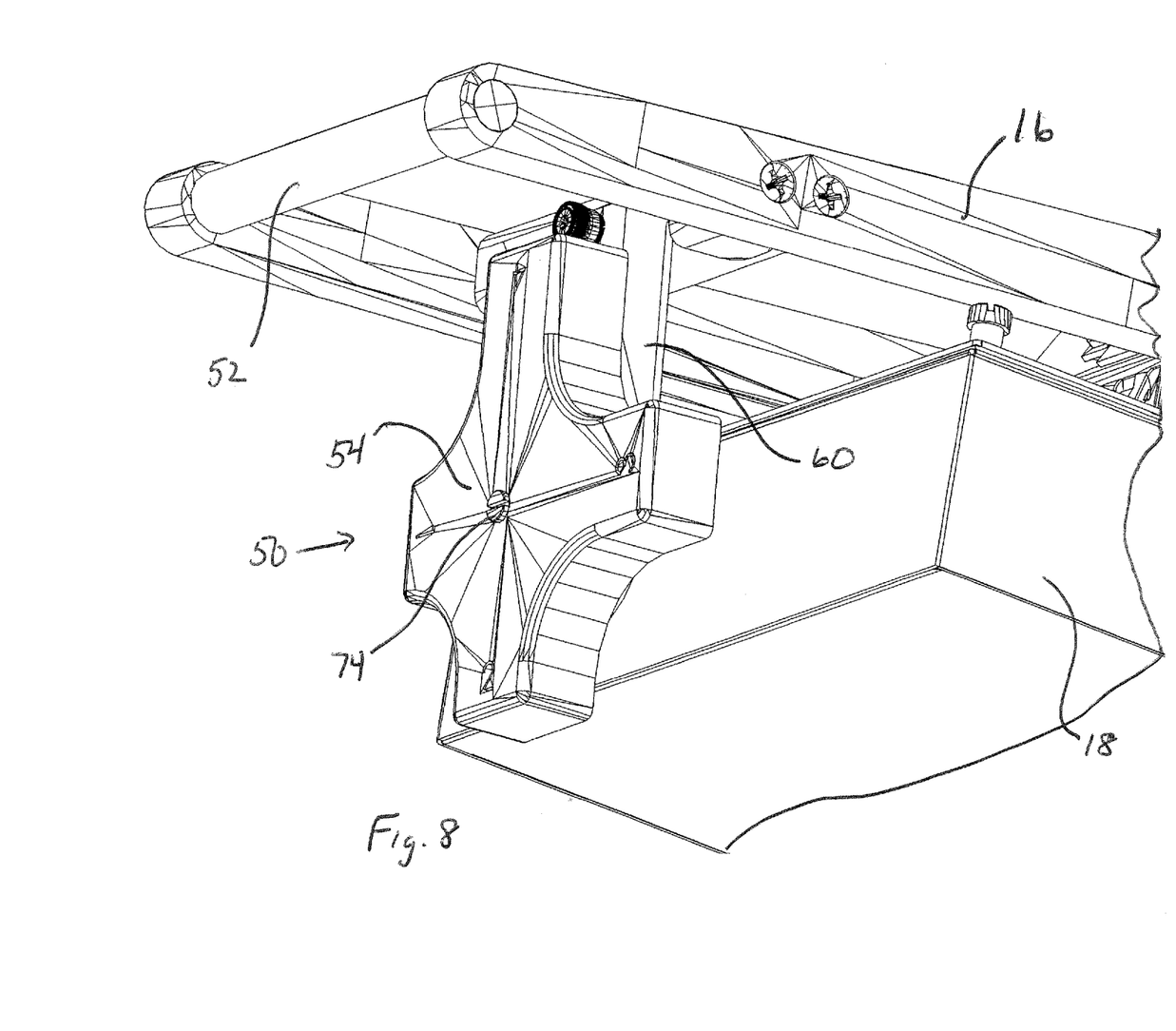
FIG. 8 is a partial front perspective of the upper griddle mechanism including the adjustment block.
Figure 9:
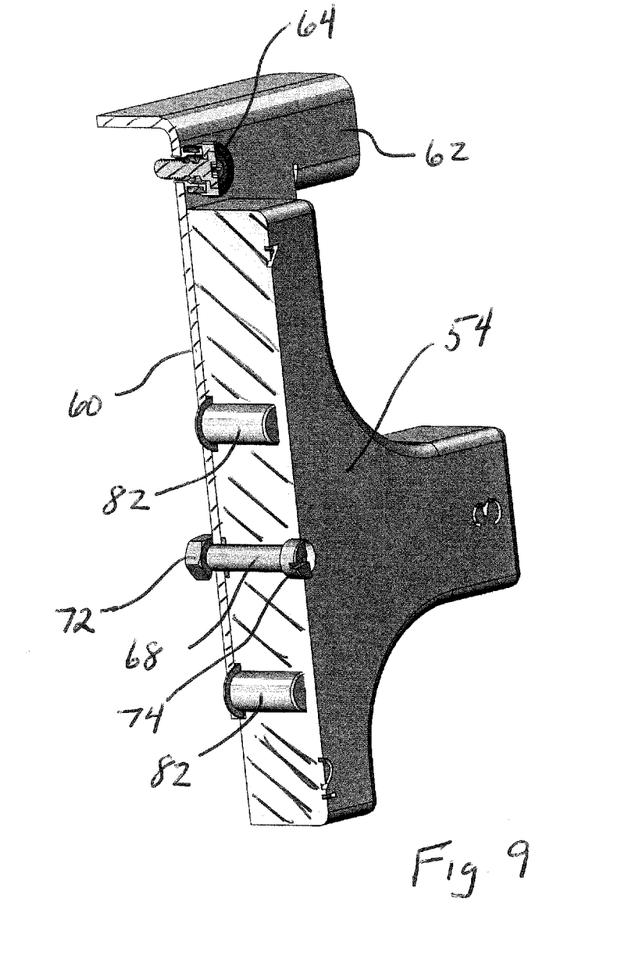
FIG. 9 is a cross-section of the adjustment block and mounting plate combination.
Figure 10:
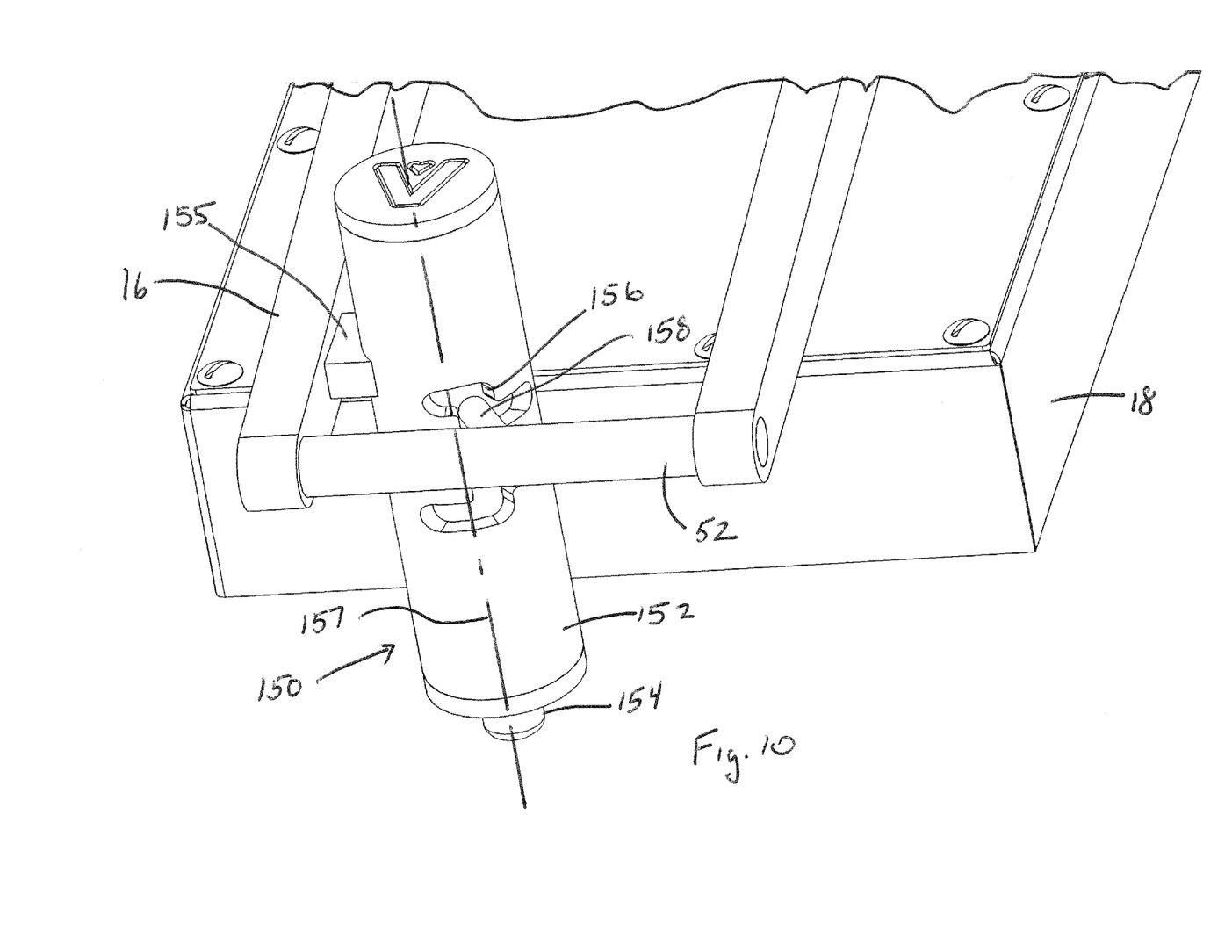
FIG. 10 is a partial front perspective of an upper griddle mechanism with an alternative gap adjustment mechanism.
Figure 11:
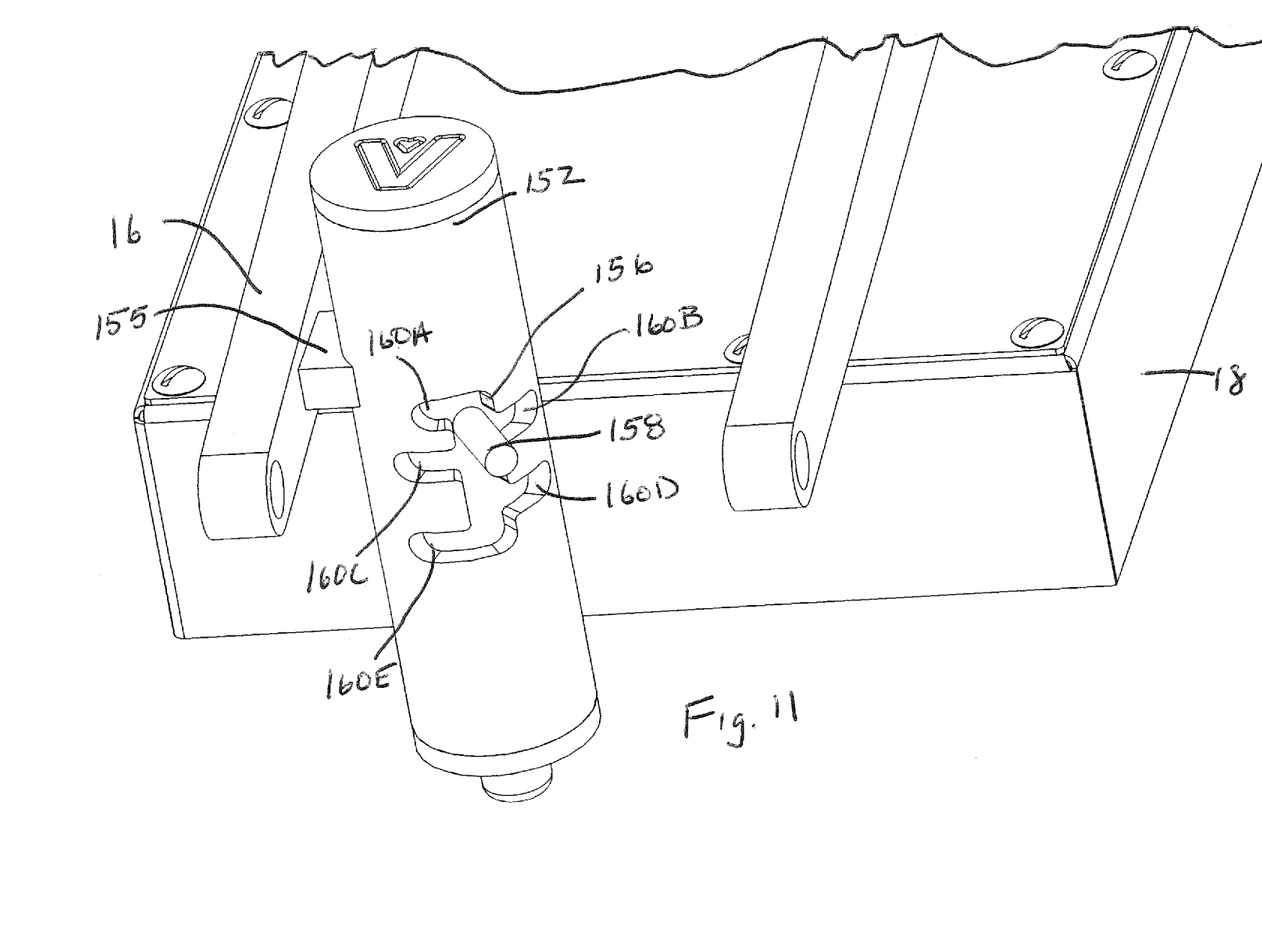
FIG. 11 is a partial front perspective of the upper griddle mechanism with alternative gap adjustment mechanism, with operator handle not shown.
Figure 12:
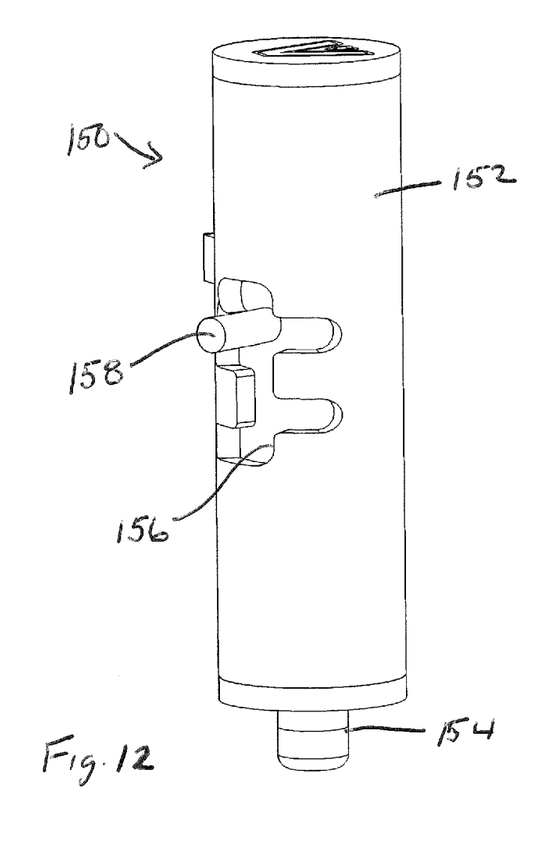
FIG. 12 is a perspective view of the gap adjustment mechanism of FIG. 10.

Notably, the adjustment block 54 is configured to enable manual rotation by an operator using a single hand, and is also configured to be releasably retained in one of the gap defining positions. In this regard, reference is made to FIG. 5 where the adjustment block is not show. A mounting plate 60 is provided with an upper bracket portion 62 that connects the mounting plate to a lateral component of the arm assembly frame 16 via a bolt 64 or other fastener. A pivot pin 68 defines the rotation axis 58 for the adjustment block and is also used to secure the adjustment block to the plate. By way of example, the pivot pin 68 extends through both an opening 70 (FIG. 6) in the adjustment block and an opening in the mounting plate 60 and is secured in place by a lock nut 72 (FIG. 7) or other suitable member such as a pin at the back side of the mounting plate. The head 74 (FIG. 8) of the pin holds the adjustment block against separation from the mounting plate 60. The connection provides some play between the adjustment block 54, the pin 68 and the mounting plate 60 that is sufficient to permit rotation of the adjustment block 54.

In order to retain the adjustment block 54 in any one of the desired four gap defining positions, the mounting plate 60 includes openings 80 that interact with the balls 86 of spring-loaded ball detent assemblies 82, where the ball detent assemblies 82 are loaded within openings 84 at the back side of the adjustment block 54. In the illustrated embodiment the pair of ball detent assemblies 82 are spaced apart by 180 degrees, and two pairs of diametrically opposed openings 80 are provided. At each gap defining location of the adjustment block 54 (e.g., in this case where one of the extensions 56A-56D extends downward in the view of FIG. 4), the pair of ball detents will align with one of the pairs of diametrically opposed openings to latch and retain the adjustment block in place. However, the latching action can be overcome by supplying sufficient rotational force to the adjustment block 54 to overcome the spring bias of the ball detents.

As mentioned above, the above configuration enables an operator to adjust gap size with a one-handed rotation of the adjustment block. Moreover, the ball detent arrangement provides the operator with a physically perceivable feedback of when the adjustment block has actually latched into the desired gap receiving orientation. The front side of each extension can, in some embodiments, include indicia identifying the gap size. For example, a specific gap size dimension may be marked on each extension, or a generic gap size indicia (such as 1, 2, 3 and 4) may be marked on the extensions. In the latter case, operator cooking instructions for various food items may simply instruct the operator to set the gap adjustment to an appropriate gap size number.

It is recognized that other gap adjustment mechanisms could be incorporated into the arm assembly so as to be carried by and move with the arm assembly. For example, in an alternative embodiment shown in FIGS. 10-14, a gap adjustment mechanism 150 includes a cylindrical assembly with an outer cylinder 152 and a stop member 154 protruding from the bottom of the cylinder 152. The lower end of the stop member may, in one example, be of a resilient material (e.g., a rubber stop affixed to the lower end of a metal rod/shaft the protrudes from the cylinder 152). The outer cylinder may be retained to the arm assembly frame 16 by a mount block 155, so as to be carried with the frame 16. The outer cylinder 152 includes an adjustment slot 156 through which an adjustment pin 158 extends. The adjustment slot 156 includes retention zones 160A-160E that operate as gap defining positions into which the pin 158 can be moved and retained. Depending upon the retention zone in which the pin 158 is located, the distance by which the stop member 154 protrudes from the bottom of the cylinder 152 varies. Notably, an operator can adjust the gap size with one hand by grasping the cylinder 152 and moving the pin 158 with his/her thumb.

Figure 13:
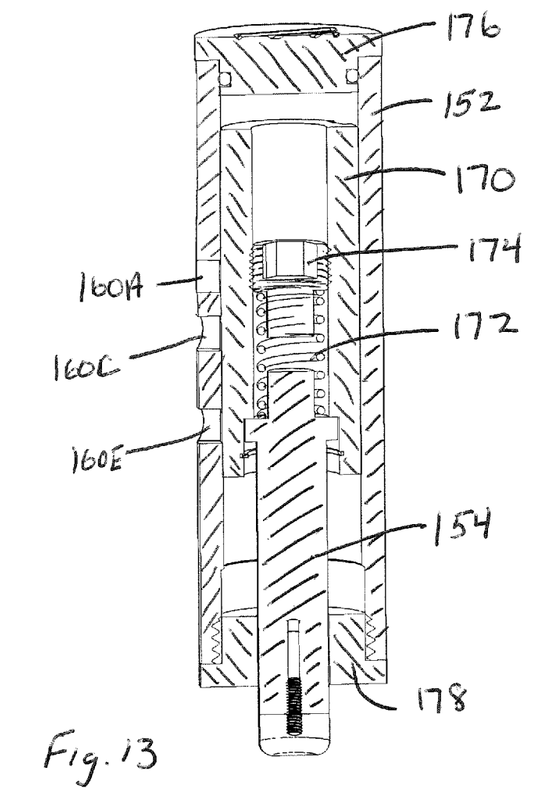
FIG. 13 is a cross-section of the gap adjustment mechanism of FIG. 12.
Figure 14:
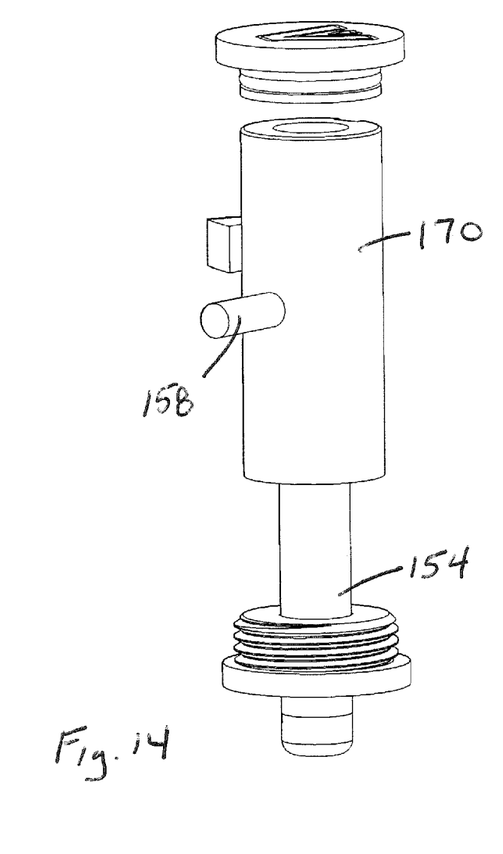
FIG. 14 is a perspective view of the gap adjustment mechanism of FIG. 12 with outer cylinder not shown.

As best seen in FIGS. 13 and 14, an inner cylinder 170 is slidably retained within the outer cylinder 152 and the pin 158 is connected to the inner cylinder. When the pin 158 moves relative to the outer cylinder 152, the inner cylinder 170 correspondingly moves as well. An internal compression spring 172 biases the stop member 154 downward, with the degree of bias being adjustable according to the position of an upper insert 174 that is threaded within the inner cylinder 170. Upper and lower sealing caps 176 and 178 complete the assembly. In addition to the mechanism 150 providing gap adjustment, the bias provided by the internal compression spring 172 enables the effective weight of the upper griddle plate to remain constant, regardless of gap selection, because the bias force provided by the compression spring does not change as between selected gap positions. Moreover, this bias is adjustable as noted above.

In the case of the above exemplary gap adjustment mechanisms, in each case gap adjustment is achieved by rotating a component of the mechanism about an axis. In the case of mechanism 50 wherein the mounting block 54 rotates about an axis 55 (FIG. 3) that is generally horizontal (i.e., within about ten degrees of horizontal) when the arm assembly is in the lower cooking position. In the case of mechanism 150, inner cylinder rotates about an axis 157 (FIG. 10) that is generally vertical (i.e., within about ten degrees of vertical) when the arm assembly is in the lower cooking position.

In the case of both of the above exemplary gap adjustment mechanisms, the mechanism is located toward a forward portion of the arm assembly, but rearward of the operator handle 52, 152. In each case, the gap adjustment mechanism is located along an axial length of the arm assembly 14 between the upper griddle plate and the operator handle, providing accessibility and positioning to interact with a portion of the lower griddle apparatus housing that is forward of the lower griddle plate. In the case of both of the above exemplary gap adjustment mechanisms, the mechanism is located substantially centrally along a lateral width of the arm assembly (i.e., aligned within the middle one-third of the lateral width of the upper griddle plate of the arm assembly), and only a single mechanism needs to be adjusted to define the gap for the griddle apparatus. Moreover, in each case adjustment of the gap adjustment mechanism does not vary a position of the upper griddle plate on the arm assembly, enabling a relatively simple connection of the upper griddle plate to the arm assembly.

It is to be clearly understood that the above description is intended by way of illustration and example only, is not intended to be taken by way of limitation, and that other changes and modifications are possible.

The invention claimed is:

1. A griddle apparatus, comprising:
  a lower griddle plate supported by a griddle body having a front side, a rear side, a left side and a right side; and
  an upper griddle plate mounted on arm assembly for movement relative to the lower griddle plate between a lower cooking position and an upper access position, wherein the arm assembly includes a rear attachment at a support column located at the rear side of the griddle body, when the arm assembly is in the lower cooking position the arm assembly extends from the rear side of the griddle body over the lower griddle plate and toward the front side of the griddle body such that a front end portion of the arm assembly is located forward of a front end portion of the lower griddle plate, wherein the arm assembly carries a gap adjustment mechanism positioned on the front end portion of the arm assembly such that the gap adjustment mechanism is positioned at the front side of the griddle body when the arm assembly is in the lower cooking position, wherein the gap adjustment mechanism that includes a plurality of gap defining orientations, and the gap adjustment mechanism moves with the arm assembly;
  wherein the gap adjustment mechanism comprises a rotatable adjustment block having a plurality of supporting extensions extending outward from a central portion of the adjustment block, wherein each supporting extension rotates with the adjustment block and has a distal end and a length defined between a rotational axis of the adjustment block and the distal end, and wherein the supporting extensions have different lengths that define respective different gap sizes as between the upper griddle plate and the lower griddle plate when the arm assembly is in the lower cooking position;
  wherein the griddle body includes a lower griddle housing, and the adjustment block is located such that the distal end of one of the supporting extensions engages with a portion of the lower griddle housing forward of the front end portion of the lower griddle plate when the arm assembly is in the lower cooking position;
  wherein the rotatable adjustment block is mounted to a plate member and a ball detent arrangement is provided between the adjustment block and the plate member to latch the adjustment block in any one of multiple gap defining orientations;
  wherein the ball detent arrangement comprises at least one ball detent assembly carried for movement with the adjustment block and multiple openings in the plate member that are positioned for selective alignment with the ball detent assembly.

2. The griddle apparatus of claim 1, wherein the rotational axis is generally horizontal when the arm assembly is in the lower cooking position.

3. The griddle apparatus of claim 1, wherein the adjustment block is sized and shaped to permit one-handed operator rotation.

4. A griddle apparatus, comprising:
  a lower griddle plate supported by a griddle body having a front side, a rear side, a left side and a right side;
  a support column extending upward from the rear side of the griddle body;
  an arm assembly carrying an upper griddle plate, the arm assembly including a rear end portion, a front end portion, a left side and a right side, the rear end portion of the arm assembly pivotally connected to the support column for enabling movement of the arm assembly between a lower cooking position and a raised access position, when the arm assembly is in the lower cooking position the arm assembly extends from the rear side of the griddle body over the lower griddle plate and toward the front side of the griddle body such that the front end portion of the arm assembly is located forward of a front end of the lower griddle plate, wherein the arm assembly further includes a gap adjustment mechanism located at the front end portion of the arm assembly but rearwardly of an operator handle located at a front terminus of the arm assembly, wherein the operator handle is used to pivot the arm assembly;
  wherein the gap adjustment mechanism moves with the arm assembly and includes a support portion that contacts the griddle body to define a gap between the lower griddle plate and the upper griddle plate when the arm assembly is in the lower cooking position, wherein the gap adjustment mechanism is rotatable about a rotation axis that runs from the front end portion of the arm assembly toward the rear end portion of the arm assembly and rotation of the gap adjustment mechanism rotates the support portion;

wherein the griddle body includes a lower griddle housing, wherein the support column extends upward from the lower griddle housing, the lower griddle plate supported on the lower griddle housing; wherein the gap adjustment mechanism is located to engage with a portion of the lower griddle housing forward of the front end of the lower griddle plate when the arm assembly is in the lower cooking position;

wherein the portion of the lower griddle housing is higher than a cooking surface of the lower griddle plate.

5. The griddle apparatus of claim 4 wherein the gap adjustment mechanism is located at the front end portion of the arm assembly and along an axial length of the arm assembly at a location between a front end of the upper griddle plate and the operator handle.

6. The griddle apparatus of claim 4 wherein adjustment of the gap adjustment mechanism does not vary a position of the upper griddle plate on the arm assembly.

7. The griddle apparatus of claim 4, wherein the gap adjustment mechanism is located substantially centrally along a lateral width of the arm assembly.

\* \* \* \* \*